United States Patent [19]
Uehara

[11] Patent Number: 4,828,477
[45] Date of Patent: May 9, 1989

[54] DEVICE FOR PREVENTING SCATTERING OF MOLDED ARTICLES EJECTED FROM RESIN MOLDING MACHINE

[76] Inventor: Akira Uehara, 1-19-18,Nishi-Tsutsujigaoka, Chofu-Shi, Tokyo 182, Japan

[21] Appl. No.: 105,043

[22] Filed: Oct. 6, 1987

[30] Foreign Application Priority Data

| Mar. 12, 1987 | [JP] | Japan | 62-36410[U] |
| Mar. 19, 1987 | [JP] | Japan | 62-40510[U] |
| Apr. 1, 1987 | [JP] | Japan | 62-49169[U] |
| May 15, 1987 | [JP] | Japan | 62-72565[U] |

[51] Int. Cl.$^4$ ............................................. B29C 45/84
[52] U.S. Cl. ................................... 425/151; 264/334; 425/556; 425/DIG. 33
[58] Field of Search .............. 425/139, DIG. 33, 151, 425/DIG. 34, 152, 153, 542, 554, 556, DIG. 200, DIG. 201; 264/334

[56] References Cited
FOREIGN PATENT DOCUMENTS
56-159225 11/1981 Japan.
56194011 12/1983 Japan.

*Primary Examiner*—Jay H. Woo
*Assistant Examiner*—Timothy W. Heitbrink
*Attorney, Agent, or Firm*—Sandler & Greenblum

[57] ABSTRACT

Disclosed is a device for preventing the scattering of ejected molded articles in a plastic forming. The scattering prevention device includes screens made of a synthetic resin film and disposed at both sides of molds mounted on a fixed die plate and a movable die plate and inside a space defined by tie bars in such a manner that the molds can be screened, and magnetic assemblies coupled to each of two lateral ends of each of the screens for fixing the screen to the opposed molds or die plates, so that, while the molds are open, the screens are extended, while the molds are being clamped, the screens are contracted and folded. The height of each of the screens is set such as to be smaller than a gap between the upper and lower tie bars, so that the screens can be folded outwardly from between the upper and lower tie bars. Alternatively, the scattering prevention device includes bar-shaped coil springs, screens which can be folded in a bellows fashion, the screens being hung from the coil springs, magnetic assemblies for fixing both ends of each of the coil springs to the fixed and movable molds or the fixed and movable die plates, and hanging screens made to hang from the lower ends of the opposed fixed and movable molds.

12 Claims, 10 Drawing Sheets

DEVICE FOR PREVENTING SCATTERING OF MOLDED ARTICLES EJECTED FROM RESIN MOLDING MACHINE

BACKGROUND OF THE INVENTION

Field of the Invention

The present invention relates to a device for preventing the scattering of molded articles ejected from a resin molding machine which produces a plastic, and, more particularly, to a device for screening the vicinity of a mold so as to prevent the scattering of molded articles when ejected from the mold immediately after they have been processed by an injection molding machine.

Description of the Prior Art

Known and commonly used injection molding machines comprise a frame 21, an injection mechanism section 22, a mold clamping mechanism section 23, a hydraulic drive section 24, an electric control section, and so on, as shown in FIGS. 17 and 18.

The injection mechanism section 22 is generally designed to inject a melting material through a main sprue (not shown) into a runner which communicates with a plurality of cavities through gates.

The mold clamping mechanism section 23 includes a fixed die plate 26, a movable die plate 27, tie bars 28 (28$_1$ to 28$_4$) inserted through the fixed and movable die plates 26 and 27 at the four corners thereof, a fixed mold 29 mounted on the fixed die plate 26, and a movable mold 30 mounted on the movable die plate 27. When the molds are opened after the molding has been completed, an ejector 31 drops molded articles into a discharge section 32 where the molded articles are accommodated in a certain container.

In the case of resin molded articles of the type which need to be kept clean, attention must be paid to ensure that not even one soiled molded article is included so as to avoid the problems which might otherwise occur when they are assembled to form a finished product.

However, in the conventional injection molding machine, since both sides of the opened molds 29 and 30 fixed to the fixed and movable die plates 26 and 27 are open, when the molded articles are released from the mold by the ejector 31, the runner and the molded articles are separated from each other at the connecting gates and the separated molded articles are often struck against the lower tie bars and are soiled by a lubricant for the movable die plate or fall on the base surface of the frame and are dirtied by the oil coated thereon. Alternatively, the molded articles do not drop into the container but are scattered therearound.

If the molded parts are of the type which need to be kept clean, inclusion of even one that is soiled may lead to an accident or failure during assembly.

Even if the number of molded articles accommodated in the container is counted by a counter, a tendency for some to scatter around the container makes a precise count impossible, and may lead to a shortage of parts during assembly.

Accordingly attempts have been made to provide a barrier around the exterior of the mold of the injection molding machine so as to prevent the released, molded articles from scattering and being soiled.

Such a scattering prevention screen has been proposed in the specifications of, for example, Japanese Utility Model Laid-Open No. 159225/1981 (which corresponds to Japanese Utility Model Application No. 58996/1980 entitled Movable Curtain for Plastic Molding Machine) and Japanese Utility Model Laid-Open No. 194011/1983 (which corresponds to Japanese Utility Model Application No. 92043/1982 entitled Guide Skirt for Plastic Molding Machine). In both cases, the screening device is fixed by inserting bolts or vices into threaded holes in the molds or die plates. However, drilling of the threaded holes in the molds or die plates is a time-consuming task and requires skill. When the screening device is shifted, more threaded holes must be drilled at new positions, making the mounting of the screening device even more troublesome. Further, the molds have to be inspected or maintained frequently, and the stationary screening device must therefore be removed and mounted each time such inspection or maintenance takes place. This is time-consuming and may cause problems in terms of production efficiency and safety.

SUMMARY OF THE INVENTION

In view of the above-described problems of the prior art, a primary object of the present invention is to provide a device for preventing the scattering of molded articles ejected from a resin molding machine which comprises screens made of a synthetic resin film and adapted to screen both sides of molds so that the molded articles released from the mold after being molded by an injection molding machine are not scattered, and magnetic assemblies for detachably fixing the screens to the molds or die plates.

A second object of the present invention is to provide a device for preventing the scattering of molded articles ejected from a resin molding machine which comprises screens adapted to screen both sides of molds, the screens being folded outwardly between upper and lower tie bars when they are extended following the opening of the mold, the width of each of the screens being adjustable at one lateral end thereof, the substantially central portion of each of the screens in the lateral direction being provided with bending assistance members or a bending assistance line which help the screen to bend outwardly, and hanging screens mounted on the lower ends of the opposed molds by means of magnetic assemblies.

A third object of the present invention is to provide a device for preventing the scattering of molded articles ejected from a resin molding machine which comprises bar-shaped coil springs, and screens made of a synthetic resin for screening both sides of molds, the screens being hung from the coil springs such that they are capable of extending and contracting in bellows fashion following the movement of the bar-shaped coil springs, and hanging screens mounted on the lower ends of the opposed molds by means of magnetic assemblies.

To achieve the above-described object, the present invention provides, in one of its aspects, a device for preventing the scattering of molded articles ejected from a resin molding machine which comprises screens made of a synthetic resin film and disposed at both sides of molds between a fixed die plate and a movable die plate and inside a space defined by opposed tie bars, and magnetic assemblies connected to both ends of each of the screens for fixing the screen to the opposed portions of the molds or die plates, such that the screens are extended when the molds are opened and are contracted and folded while the molds are being clamped.

The prevent invention provides, in another of its aspects, a device for preventing the scattering of molded articles ejected from a resin molding machine which comprises screens made of a synthetic resin film and disposed inside a space defined by tie bars, and magnetic assemblies connected to the screens in such a manner that the width of each of the screens is adjustable at least at one lateral end thereof, wherein the substantially central portion of each of the screens in the lateral direction is provided with a bending assistance portion which helps the screen to bend outwardly, such that, while the molds are being clamped, the screens are folded outwardly between the upper and lower tie bars.

The prevent invention provides, in another of its aspects, a device for preventing the scattering of molded articles ejected from a resin molding machine which comprises bar-shaped coil springs disposed horizontally at the upper and lower positions inside a space defined by tie bars, and screens made of a synthetic resin film, each of the screens being hung from each of the upper bar-shaped coil springs and supported by each of the lower coil springs at certain position in the longitudinal direction thereof, such that the screens are extended following the extension of the bar-shaped coil springs which is caused by the movement of a movable mold while the screens are contracted in a bellows fashion following the contraction of the coil springs.

The prevent invention provides, in another of its aspects, a device for preventing the scattering of molded articles ejected from a resin molding machine which is characterized in that each of flat magnetic assemblies which fix both ends of each of the screens comprises a magnet, and yokes gripping the magnetic pole surfaces of the magnet in such a manner that the end surfaces of the magnetic assembly form attracting portions, the magnetic assembly having hooks at the end surfaces thereof which face the attracting portions.

BRIEF DESCRIPTION OF THE DRAWINGS

The following drawing which illustrate a device for preventing the scattering of molded articles ejected from a resin molding machine comprising an injection molding machine.

DETAILED DESCRIPTION THE PREFERRED EMBODIMENTS

Figure 1:
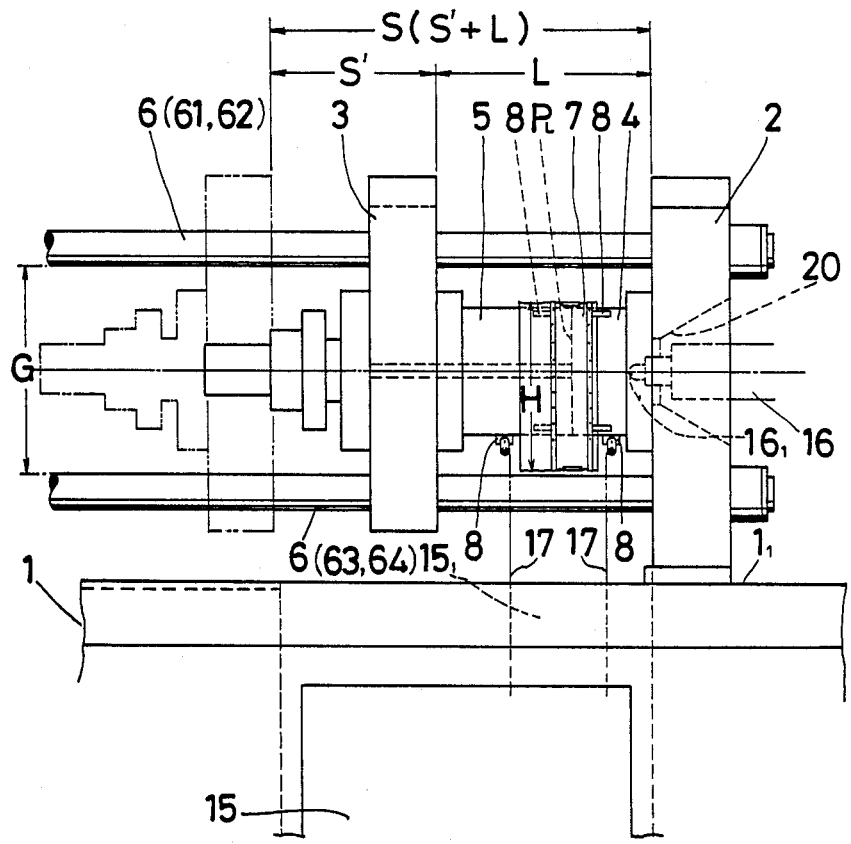
FIG. 1 is a front view of the injection molding machine in which screens of synthetic resin film are fixed by magnetic assemblies to molds, n the state wherein the molds are being clamped.
Figure 2:
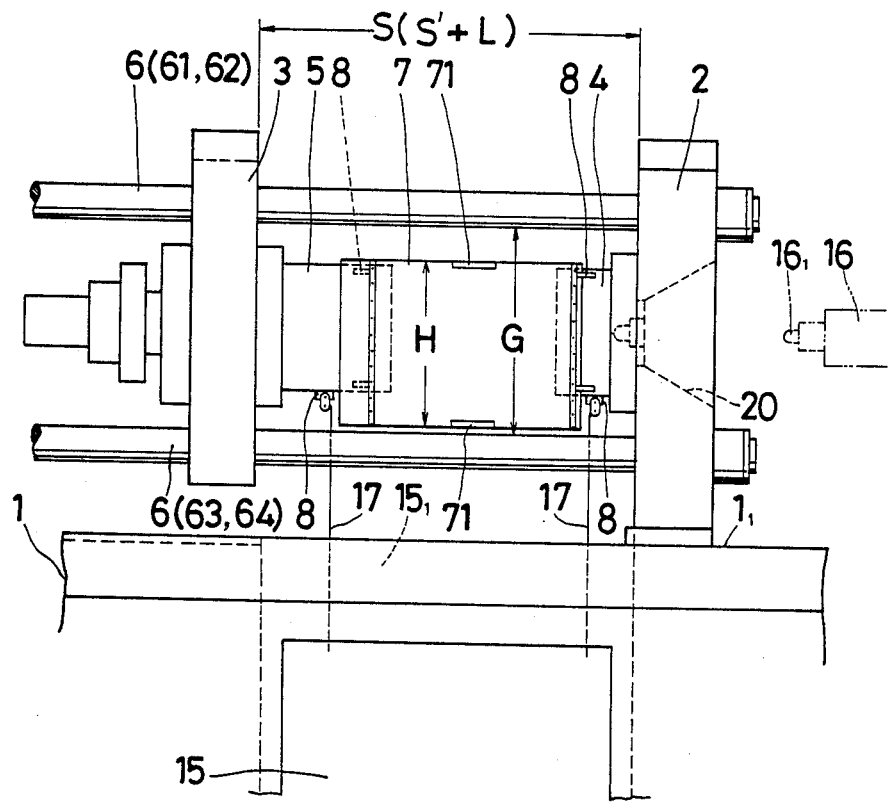
FIG. 2 is a front view of the injection molding machine of FIG. 1, in the state wherein the molds are open.

A first embodiment of the present invention will be hereinunder described with reference to FIGS. 1 to 3 and FIGS. 4 and 5. A fixed die plate 2 and a movable die plate 3 are mounted on a base surface $1_1$ of a frame 1, and tie bars 61, 62, 63, and 64 are inserted through both die plates 2 and 3 at the four corners thereof. Screens 7 made of a synthetic resin film are disposed inside a space defined by the tie bars 61 and 63 and the tie bars 62 and 64 in such a manner that they screen both sides of a fixed mold 4 fixed on the fixed die plate 2 and a movable mold 5 fixed on the movable die plate 3. Magnetic assemblies 8 are connected to the lateral ends of each of the screens 7, and the screens 7 are fixed by virtue of the attractive force of the magnetic assemblies 8 to the opposing fixed and movable molds 4 and 5, so that, while the mold is open, the screens 7 are extended and that, while the mold is clamped, the screens 7 are folded in a state wherein they are bent outwardly. The screens 7 may be fixed to the fixed and movable die plates 2 and 3 by means of the magnetic assemblies 8.

A height H of each of the screens 7 is set such that each of the screens 7 which are disposed inside the tie bars 61 and 63 and the tie bars 62 and 64 bends and protrudes outwardly from a gap G formed between the tie bars 61 and 63 on one side or the tie bars 62 and 64 on the other side while the molds are being clamped.

Figure 5:
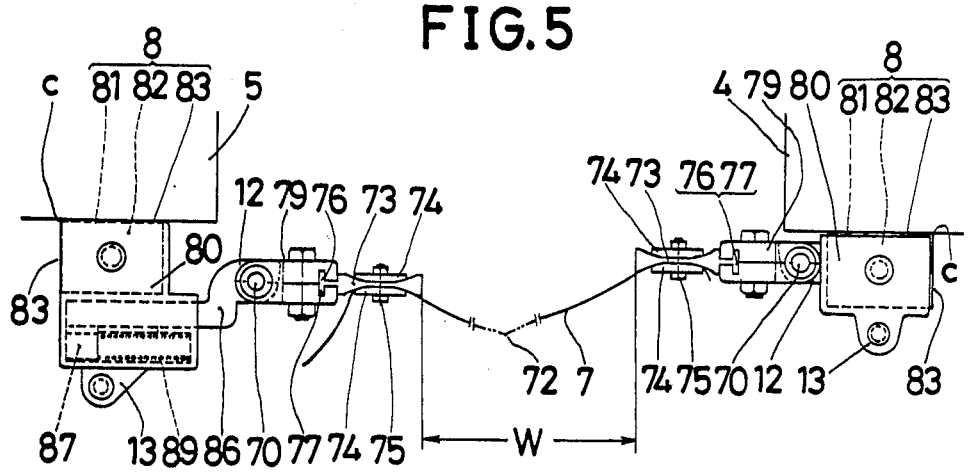
FIG. 5 is a plan view of the scattering prevention device of FIG. 4.

In order to help bend the screens 7 outwardly, the substantially central points of the longitudinal ends of each of the screens 7 are provided with bending assistance members 71 or a bending assistance line 72 (such as that shown by a dotted line in FIG. 5).

Figure 3:
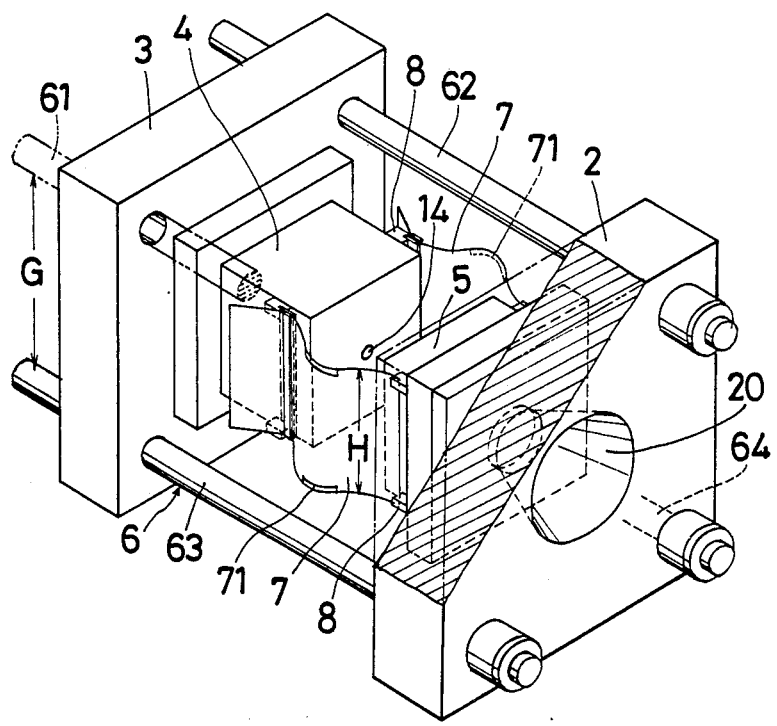
FIG. 3 is a schematic and perspective view of the molds and die plates of FIG. 1.
Figure 4:
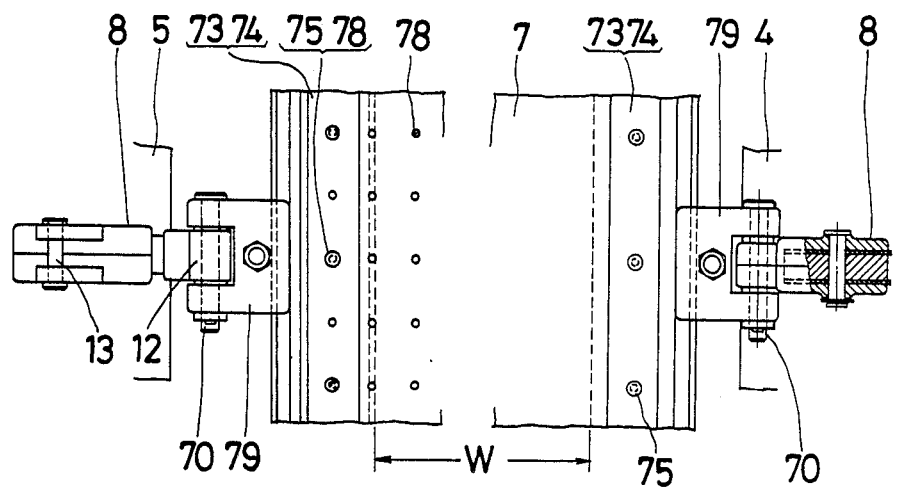
FIG. 4 is a fragmentary front view of the screens of synthetic resin film and the magnetic assemblies of the scattering prevention device.

FIGS. 4 and 5 show the synthetic resin screen 7 shown in FIGS. 1 and 3, and the magnetic assemblies which allow the screen 7 to be mounted on the molds 4 and 5 or the die plates 2 and 3.

An elongated support body 73 which has a large number of through-holes 78 for vices 75 in the longitudinal direction thereof is connected to each lateral end of the screen 7. The width W of the screen 7 between the elongated support bodies 73 can be adjusted by changing the position of the through-holes 78 in the lateral direction.

The magnetic assemblies 8 each comprise a flat plate-like magnet piece 81, and a pair of yokes 82 which are disposed on and at the bottom of N and S magnetic pole surfaces of the magnet piece 81. The magnetic assembly is accommodated in a non-magnetic holder 80, and the two sides of the magnetic assembly 8 which join at the corner indicated by c form attracting portions 83.

The magnetic piece 81 is substantially a flat plate-like block, and its length l, width w, and thickness t may, for example, be 22 mm, 16 mm, and 5 mm, respectively. If the magnet piece 81 has the above-described size, it is preferable for each of the yokes 82 which retain the N and S magnetic pole surfaces of the magnet piece 81 to have a thickness of about 1.4 mm. Preferably, each of the yokes 82 has a size which is slightly larger than that of the magnet piece 81 and which enables the attracting portions 83 to slightly project from the edges of the magnet piece 81 which has a thickness t.

The magnetic assemblies 8 mounted on the movable mold 5 are each equipped with a shock absorbing mechanism which absorbs any impact imparted to these magnetic assemblies 8 by the substantially extended synthetic resin film screen 7. The shock absorbing mechanism comprises a coupling member 86 having one end and a projection 87, and a coil spring 89, the one end of the projection 87 of the coupling member 86 and the coil spring 89 being accommodated in the non-magnetic holder 80.

Each of the magnetic assemblies 8 has through-holes 10 which consist of a through-hole $10_1$ drilled in the magnetic piece 81, through-holes $10_2$ drilled in the yokes 82, and through-holes $10_3$ provided in the non-magnetic holder 80. A non-magnetic shaft 11 is inserted through the through-holes 10. Each of the magnetic assemblies 8 also has hooks 12 and 13 which are disposed on the sides thereof which face the attracting portions 83 for the purpose of supporting an object such as the screen 7.

Figure 7:
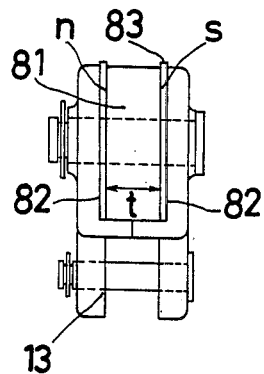
FIG. 7 is a side view of the magnetic assembly of FIG. 6.
Figure 6:
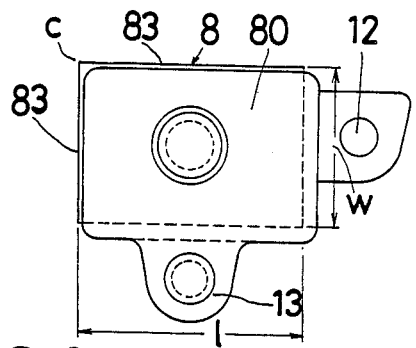
FIG. 6 is a plan view of the magnetic assembly to be used to mount the synthetic resin film screen.
Figure 8:
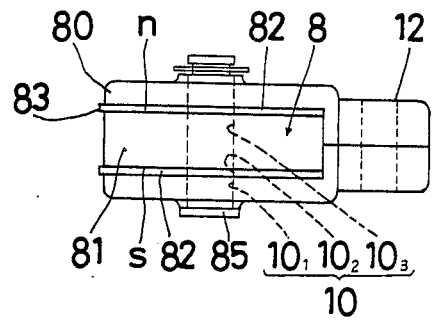
FIG. 8 is a front view of the magnetic assembly of FIG. 6.

An assembly means of the screen 7 made of synthetic resin film comprises the elongated support body 73 provided on each of the lateral ends of the screen 7, holding members 74 which clamp the elongated support body 73, a plurality of fasteners 75 such as vices which fix the elongated support body 73 and the holding members 74 together, head portions 76 having a T-shaped cross-section and disposed on each elongated support body 73, and a connecting member 79 having a groove 77 through which the connecting member 79 frictionally and slidably engages each of the head portions 76, the connecting members 79 being connected by a shaft body 70 to the hook 12 or 13 provided on one end of each of the magnetic assemblies 8 shown in FIGS. 6 to 8. In the magnetic assemblies 8 mounted on the movable mold 5, the connecting member 79 is connected to the holder 80 of the magnetic assembly 8 by the shaft body 70.

FIGS. 6 to 10 show examples of the magnetic assembly 8. FIGS. 6 to 8 illustrate a basic one which comprises the magnet piece 81, and the pair of yokes 82 disposed on and below the N and S magnetic pole surfaces. The magnetic assembly 8 is accommodated in the non-magnetic holder 80. The two sides of the magnetic assembly 8 which join at the corner indicated by c form the attracting portions 83. The non-magnetic holder 80 is provided with the hooks 12 and 13 on the sides thereof which face the attracting portions 83.

Figure 9:
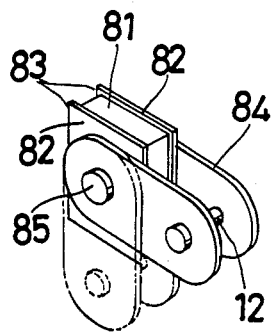
FIG. 9 is a perspective view of another example of the magnetic assembly.

FIG. 9 shows a second example of the magnetic assembly 8. In this magnetic assembly 8, the magnet piece 81, the pair of yokes 82, and links 84 disposed on the outer surfaces of the yokes 82 are coupled by a shaft 85 with each of the links being coupled pivotally. The hook 12 is formed at the distal end of each of the links 84.

Figure 10:
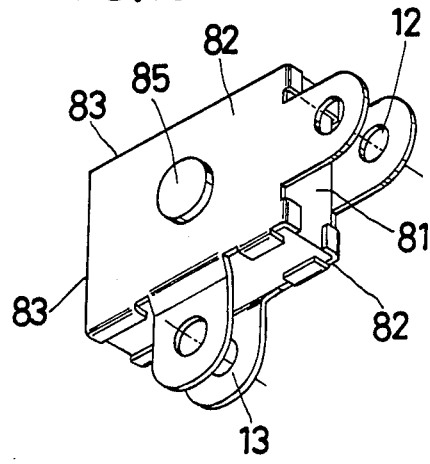
FIG. 10 is a perspective view of a third example of the magnetic assembly.

FIG. 10 is a third example of the magnetic assembly 8 in which the hooks 12 and 13 are integrally formed on the yokes 82 which clamp the magnet piece 81.

Figure 11:
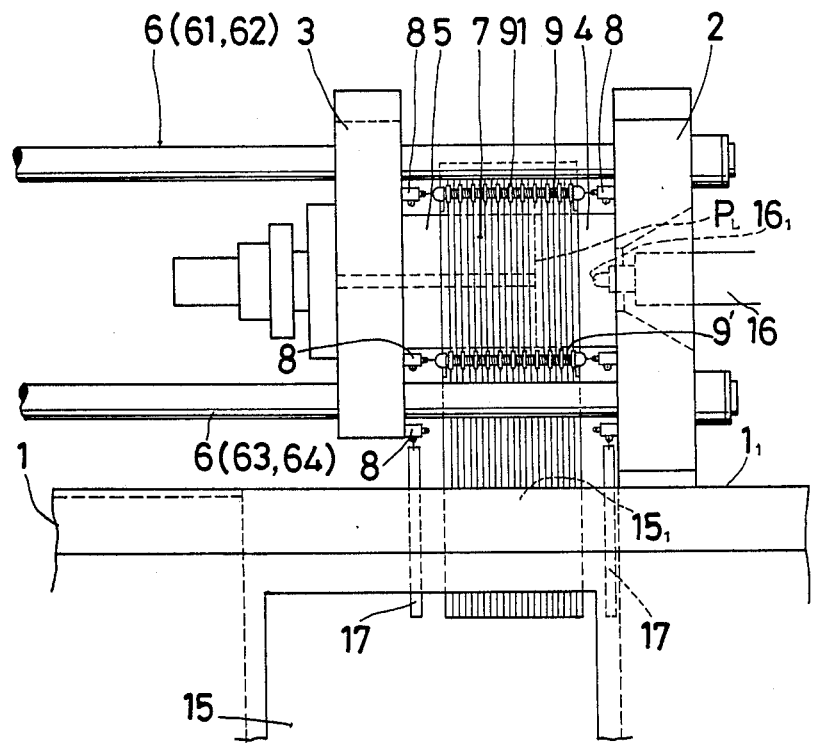
FIG. 11 is a front view of the injection molding machine in which both ends of elastic coil springs from which the synthetic resin film screens are hung are fixed by means of magnetic assemblies to the die plates, in the state wherein the molds are being clamped.
Figure 12:
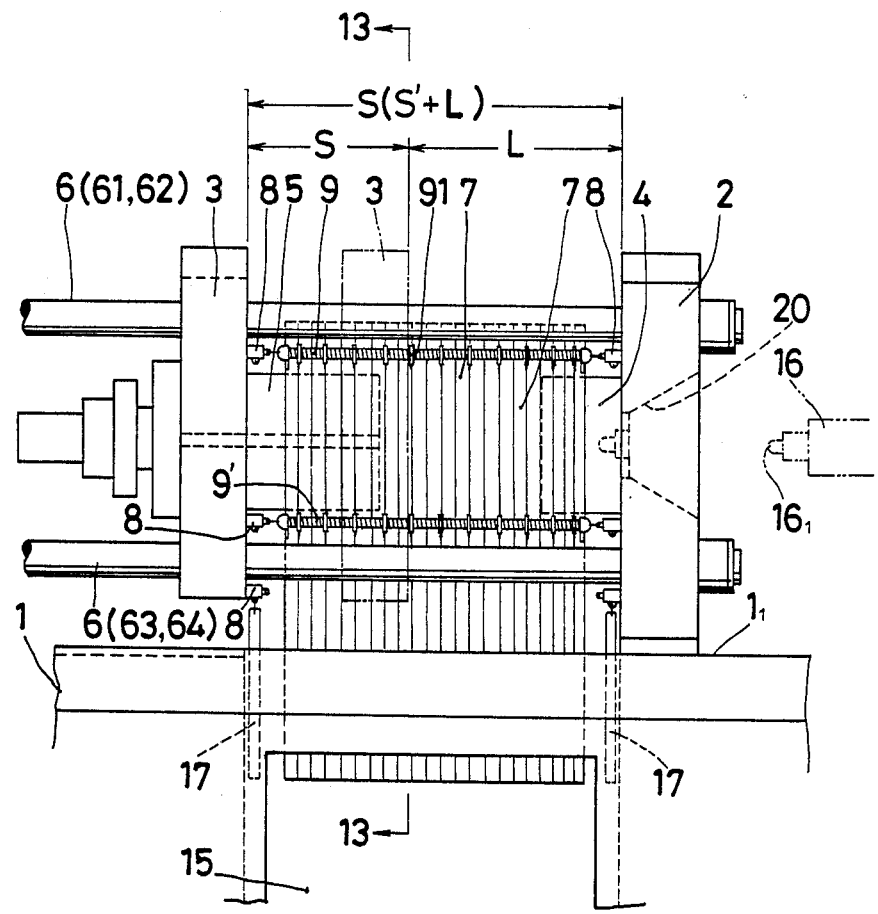
FIG. 12 is a front view of the injection molding machine in the state wherein the molds are open.
Figure 13:
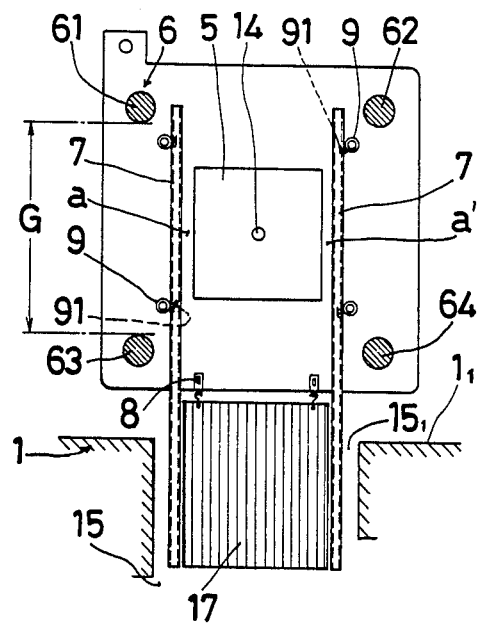
FIG. 13 is a section taken along the line 13—13 of FIG. 12.

A second embodiment of the present invention will be described now with reference to FIGS. 11 to 13. Bar-shaped coil springs 9 and 9' are disposed along both sides of the fixed and movable molds 4 and 5 mounted on the fixed and movable die plates 2 and 3 and inside the tie bars 61 and 63 and the tie bars 62 and 64. The magnetic assemblies 8 are connected to both ends of each of the coil springs 9 and 9', and the coil springs 9 and 9' are fixed by virtue of the attraction of the magnetic assemblies 8 to the fixed and movable die plates 2 and 3 with the aid of a tensional force which ensures that the coil springs 9 and 9' do not become loose when the molds are clamped.

The screen 7 made of synthetic resin film hangs from each of the coil springs 9. The length of the screen 7 is set such that it extends downward below a discharge exit $15_1$ allowing for discharge of the molded articles.

The coil springs 9 and 9' may be fixed to the fixed and movable molds 4 and 5 by means of the magnetic assemblies 8.

To hang the screen 7 from each of the upper coil springs 9, a large number of hook members 91 are fitted onto the coil spring 9, and are hooked onto the upper portion of the screen 7 so as to support it. Each of the hook members 91 comprises a ring and a hook. Similarly, each of the lower coil springs 9' is provided with the hook members 91 on which the screen 7 is hung.

The device for preventing the scattering of molded articles of the first and second embodiments includes hanging screens 17 which hang from the lower ends of the opposed molds 4 and 5 or die plates 2 and 3 by means of the magnetic assemblies 8. Each of the hanging screens 17 is formed in bellows fashion, so that the width thereof can be adjusted in accordance with the dimensions of the particular molds.

Function or operation of the scattering prevention device of the first and second embodiments will be described below with reference to FIGS. 1 to 3, 11 to 13, and 14 to 16.

Figure 14:
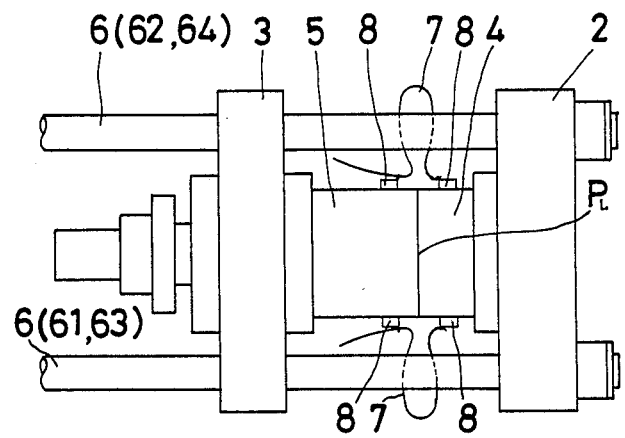
FIG. 14 is a schematic plan view of the injection molding machine in the state wherein the molds are clamped and the screens are folded outwardly.
Figure 15:
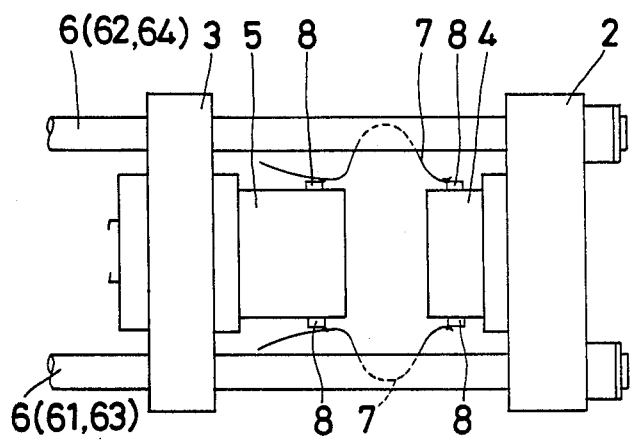
FIG. 15 is a schematic plan view of the injection molding machine in the state wherein the molds are on their way to their opened position.
Figure 16:
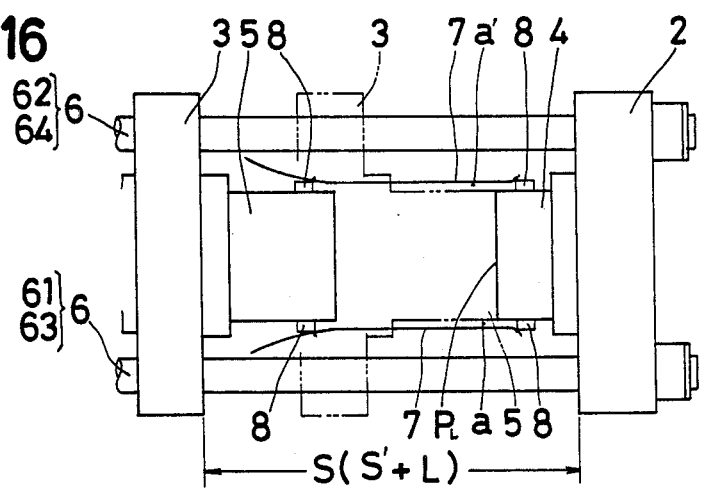
FIG. 16 is a schematic plan view of the injection molding machine in the state wherein the molds are opened.
Figure 17:
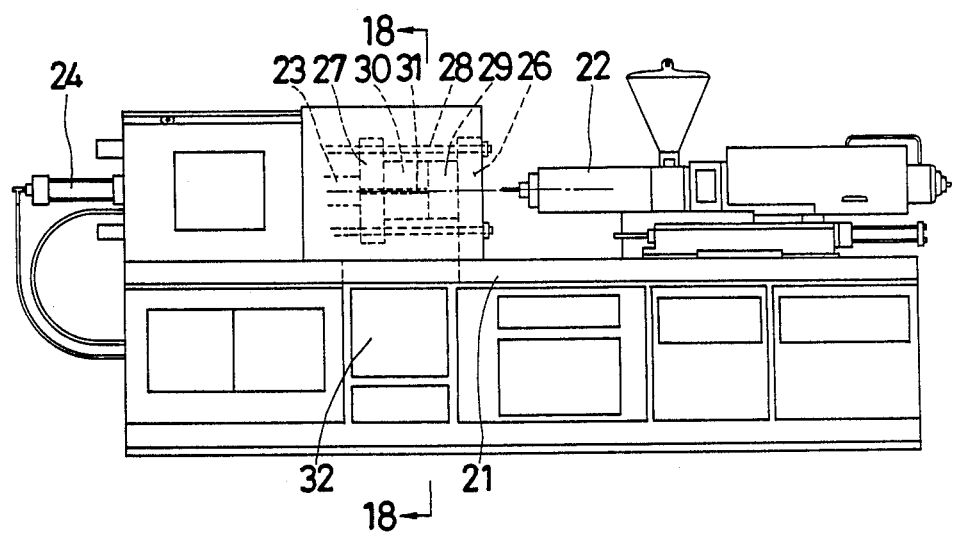
FIG. 17 is a front view of a known injection molding machine.
Figure 18:
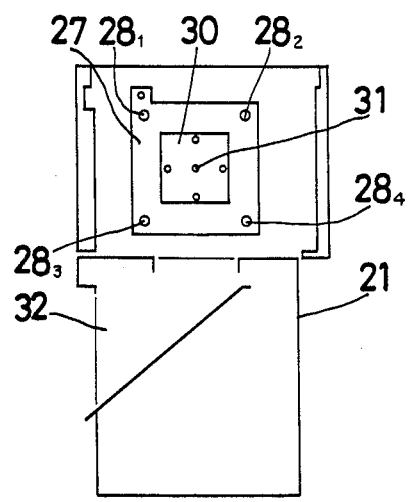
FIG. 18 is a section taken along the line 18—18 of FIG. 17.

The two lateral ends of the screens 7 of synthetic resin film are fixed on the opposing molds 4 and 5 or die plates 2 and 3 by means of the magnetic assemblies 8 at suitable positions at which they provide a barrier around the parting line $P_L$ of the molds 4 and 5. As a result, when the molds are clamped, as shown in FIG. 14, the screens 7 shown in FIGS. 1 and 3 are folded up while bending outwardly. The bellows-type screens shown in FIGS. 11 to 13 are folded in bellows fashion.

Next, a heating cylinder of the injection mechanism section is advanced, by reason of which a nozzle $16_1$ of the heating cylinder is brought into contact with the sprue of the mold 4 through a hole 20 of the fixed die plate 2, and injection is then conducted in accordance with the known molding process of the injection molding machine. After the molding is completed, the movable die plate 3 is moved past an intermediate position shown in FIG. 15 to a set stroke indicated by S in FIG. 16. Following this movement of the movable die plate 3, the screens 7 are extended in such a manner that they screen open spaces a and a'. In consequence, the molded articles which are released from the movable mold 5 after the completion of the molding by the ejector 14 are led to a discharge port 15 than into a certain container by the screens 7 and/or the hanging screens 17 mounted on the opposing molds 4 and 5 or die plates 2 and 3 by the magnetic assemblies 8, without contacting the tie bars 6 (61 to 64) or scattering outside the discharge port.

When the movable mold 5 is advanced toward the fixed mold 4 for reclamping, the screens 7 follow the movement of the movable mold 5, and are folded up while being bent outwardly, returning to their original positions as shown in FIG. 14 and thus completing one cycle of the operation.

The shock imparted by each of the extended screens 7 is absorbed by the shock absorbing mechanism incorporated in each of such magnetic assemblies mounted on the movable mold 5 as shown in FIGS. 4 and 5, the shock absorbing mechanism comprising the coupling member 86, the projection 87 provided on the proximal end thereof, and the coil spring 89, the coupling member 86, the projection 87, and the coil spring 89 all being accommodated in the non-magnetic holder 80.

The screens of the device for preventing the scattering of molded articles according to the present invention are capable of screening both sides of the fixed and movable molds when small sized and precision parts are molded by the injection molding machine, so that both sides of the space between the fixed and movable molds which is formed during the opening of the molds can be screened. In consequence, even if the molded articles are hurled out of the mold by the pressure generated by the ejecter, they bounce against the screens and fall inwardly through the discharge port into the container provided without being scattered on the floor around the injection molding machine. It is therefore possible to increase the production yield and the production efficiency.

If the length of each of the screens is set such that the lower end of the screen hangs below the discharge port, prevention of scattering of the molded articles can be carried out even more efficiently.

The hanging screens mounted on the lower ends of the opposed molds are capable of screening the other two sides which cannot be screened by the main screens, thereby making screening of the four sides of the space formed by the opposed molds possible and further increasing the efficiency of scattering prevention. The screens which screen the first two sides of the space formed by the open molds are disposed inside the space defined by the tie bars. Therefore, when molded articles are ejected by the ejecter, they do not make contact with the lower tie bars, eliminating the possibility of molded articles becoming soiled by the oil on the tie bars. Any synthetic resin can be used to form the screens so long as it is flexible, heat-resistant, and oil-resistant. However, if a transparent film resin is employed, the molds can be seen through the screens even when the entire exterior thereof is shielded. This makes the inspection easier and ensures safety. The flexibility of the screens enables them to be bent outwardly and folded or to be folded up in a compact bellows-like manner. This means that the screens do not occupy a large space when folded. Since the screens are heat-resistant, they will not become melted or deformed even when disposed in the vicinity of the molds, whose temperature is raised very high.

The screens are removably fixed to the molds or die plates by using the magnetic assemblies. They can therefore be mounted or removed very easily at the time of maintenance or inspection, as compared with the fixed type screens of the prior art. The width of the screens can be adjusted, and the position at which the screens are fixed can also be varied in the longitudinal direction. These factors enable the screens to be employed with molds which are different in size or in shape, or in a resin molding machine of a different type. The screens can be assembled very easily, which ensures improved manageability.

If the height of the screens of the type which are bent outwardly and folded when the molds are clamped is set such as to be smaller than the gap between the upper and lower tie bars, the screens can be folded without being blocked by the tie bars when they project outside the tie bars at the time of clamping the molds.

When the molds are open, unnecessary contact between the released molded articles and sections of the molding machine can be avoided, thereby eliminating the risk of damage or soiling of the molded articles.

With screens of the type which are folded in a bellows fashion, their length is set such that they hang below the discharge port. The scattering of molded articles can thereby be prevented more efficiently.

What is claimed is:

1. A device for preventing scattering of molded articles ejected from a resin forming machine, said device comprising at least two pairs of tie bars, each of said pairs comprising at least an upper tie bar and a lower tie bar, wherein two opposed mold section capable of relative movement are adapted to be positioned on said at least two pairs or tie bars, said device comprising a plurality of screens formed from synthetic resin film, each of said screens being positioned at least between the upper tie bar and the lower tie bar of each tie bar pair in such a manner that, when said two mold sections are spaced from each other so as to form two substantially open sides, said screens will be adapted to screen both of said sides, said device further comprising a plurality of magnetic assemblies connected to opposed first and second ends of each of said synthetic resin film screens, said magnetic assemblies being adapted to attach said screens to said mold section via an attractive magnetic force, said screens being adapted to be extended when said mold sections are opened with respect to each other and contracted when said mold sections are moved towards each other.

2. A device in accordance with claim 1, wherein one of said mold sections is movably attached to said tie bars and the other of said mold sections is attached to said tie bars in a stationary manner.

3. A device in accordance with claim 1, wherein there are four tie bars, said tie bars being arranged to define a generally rectangular parallelepipedic volume.

4. A device in accordance with claim 3, wherein each of said screens has a height which is less than the vertical distance between upper and lower tie bars in each of said pairs of tie bars.

5. A device in accordance with claim 4 further comprising an elongated support body having fasteners, said support body being adapted to be coupled to opposite ends of each of said synthetic resin film screens, the width of each of said screens, as defined between said two mold section, being adjustable at at least one of said screen ends.

6. A device in accordance with claim 5 further comprising magnetic assemblies connected to each of said elongated support bodies, and a hanging screen adapted to hang from lower ends of each of said mold sections by a respective magnetic assembly, wherein each of said synthetic resin film screens has a substantially central portion, as viewed in a lateral direction, each said central portion comprising means for bending each said screen such that each said screen can be folded outwardly between the tie bars in each tie bar pair when said mold sections are moved towards each other.

7. A device in accordance with claim 1, comprising a plurality of bar-shaped coil springs positioned within the space defined between said tie bar pairs, said coil springs extending substantially horizontally along both of said open sides, each of said screens being supported by a respective pair of said bar-shaped coil springs, said device further comprising a plurality of hanging screens extending downwardly from respective lower surfaces of said two mold sections.

8. A device in accordance with claim 7, wherein said coil springs comprise a plurality of upper bar-shaped coil springs and a plurality of lower bar-shaped coil springs, each of said synthetic resin film screens hanging downwardly from one of said upper bar-shaped coil springs, and being supported by one of said lower bar-shaped coil springs.

9. A device in accordance with claim 7, wherein said synthetic resin film screens having a substantially bellows type configuration and being adapted to be extended and contracted, wherein at least one of said mold section is movable, said movable mold section comprising means for extending and contracting said synthetic resin film screens each of said synthetic resin film screens having a vertical length such that the lower end of each of said screens extends downwardly below a discharge port, said discharge port comprising means for discharging molded articles from said device.

10. A device for preventing scattering of molded articles ejected from a resin forming machine, said device comprising at least two paris of tie bars, each of said pairs of tie bars comprising at least an upper tie bar and a lower tie bar, wherein two opposed mold sections capable of relative movement with respect to each other are adapted to be positioned on said at least two pairs of tie bars, said device comprising at least two screens formed from synthetic resin film, each of said screens being positioned at least between the upper tie bar and the lower tie bar of each tie bar pair in such a manner that, when said two mold sections are spaced from each other so as to form two substantially open sides, said screens will be adapted to screen both of said sides, said screens thereby being spaced from each other in a generally horizontal direction, said device further comprising a plurality of connecting assemblies connected to opposed first and second ends of each of said synthetic resin film screens, said connecting assemblies being adapted to attach said screens to said mold sections, said screens being adapted to be extended when said mold sections are opened with respect to each other and contracted when said mold sections are moved towards each other.

11. A device for preventing scattering of molded articles ejected from a resin forming machine, said device comprising two pairs of substantially horizontally spaced tie bars, each of said tie bar pairs comprising at least an upper tie bar and a lower tie bar, wherein two opposed mold sections capable of relative movement with respect to each other are adapted to be positioned on said tie bars, said device comprising a plurality of screens formed from synthetic resin film, each of said screens being positioned at least between the upper tie bar and the lower tie bar of each tie bar pair in such a manner that, when said two mold section are spaced from each other so as to form two substantially open sides between them, said screens will be adapted to screen both of said sides, said device further comprising a plurality of connecting assemblies attached to first and second ends of said synthetic resin film screens, said connecting assemblies being adapted to attach said screens to said mold sections, said screens being adapted to be extended when said mold section are opened with respect to each other and contracted when said mold section are moved towards each other.

12. A device in accordance with claim 11, wherein in said each of said connecting assemblies comprises a magnetic assembly which is adapted to attach one of said screen ends to a respective mold section via an attractive magnetic force.

* * * * *

UNITED STATES PATENT AND TRADEMARK OFFICE
CERTIFICATE OF CORRECTION

PATENT NO. : 4,828,477

DATED : May 9, 1989

INVENTOR(S) : Akira UEHARA

It is certified that error appears in the above-identified patent and that said Letters Patent is hereby corrected as shown below:

At column 2, line 67, change "prevent" to ---present---.

At column 3, line 12, change "prevent" to ---present---.

At column 3, line 26, change "prevent" to ---present---.

At column 3, line 39, change "drawing" to ---drawings---.

At column 3, line 45, change "n" to ---in---.
At column 5, line 28, change "103" to ---$10_3$---.
At column 6, line 67, change "ejecter" to ---ejector---.

At column 6, line 68, change "than" to ---then---.
At column 8, line 27, change "section" to ---sections---.

At column 8, line 61, change "section" to ---sections---.

At column 9, line 26, change "section" to ---sections---.

At column 10, line 26, change "section" to ---sections---.

At column 10, line 34, change "section" to ---sections---.

UNITED STATES PATENT AND TRADEMARK OFFICE
CERTIFICATE OF CORRECTION

PATENT NO. : 4,828,477
DATED : May 9, 1989
INVENTOR(S) : Akira UEHARA

It is certified that error appears in the above-identified patent and that said Letters Patent is hereby corrected as shown below:

At column 10, line 36, change "section" to ---sections---.

At column 10, line 37, delete "in" after "wherein".

Signed and Sealed this

Twenty-third Day of July, 1991

Attest:

HARRY F. MANBECK, JR.

*Attesting Officer*  Commissioner of Patents and Trademarks